United States Patent [19]

Sadatoshi et al.

[11] Patent Number: 5,340,878
[45] Date of Patent: Aug. 23, 1994

[54] POLYPROPYLENE COMPOSITION AND FILM THEREOF

[75] Inventors: Hajime Sadatoshi; Seiichiro Ima; Eisuke Shiratani, all of Chiba, Japan

[73] Assignee: Sumitomo Chemical Company, Limited, Osaka, Japan

[21] Appl. No.: 79,558

[22] Filed: Jun. 22, 1993

[30] Foreign Application Priority Data

Jun. 30, 1992 [JP] Japan ................................. 4-172464

[51] Int. Cl.$^5$ ........................ C08L 23/10; C08L 23/04
[52] U.S. Cl. ....................................... 525/240; 524/528
[58] Field of Search .................................. 525/240, 88

[56] References Cited

U.S. PATENT DOCUMENTS

| | | | |
|---|---|---|---|
| 3,192,288 | 6/1965 | Sayko et al. | 260/897 |
| 3,358,053 | 12/1967 | Hostetler et al. | 525/88 |
| 3,647,922 | 3/1972 | Seugering et al. | 525/88 |
| 3,733,373 | 5/1973 | McConnell | 525/240 |
| 3,929,932 | 12/1975 | Castagna | 525/88 |
| 4,359,544 | 11/1982 | Hwo et al. | 524/528 |
| 4,487,871 | 12/1984 | Ishibashi et al. | 524/100 |
| 4,508,786 | 4/1985 | Ishibashi et al. | 428/461 |
| 4,514,534 | 4/1985 | Di Nardo | 524/108 |
| 5,221,715 | 6/1993 | Kagawa et al. | 525/240 |

FOREIGN PATENT DOCUMENTS

| | | |
|---|---|---|
| 0164493 | 12/1985 | European Pat. Off. . |
| 0397517 | 11/1990 | European Pat. Off. . |
| 1902573 | 9/1970 | Fed. Rep. of Germany . |
| 2017105 | 5/1970 | France . |
| 53-079939 | 7/1978 | Japan . |

*Primary Examiner*—Carman J. Seccuro, Jr.
*Attorney, Agent, or Firm*—Sughrue, Mion, Zinn, Macpeak & Seas

[57] ABSTRACT

A polypropylene composition comprising 100 parts by weight of a crystalline propylene polymer having a melt flow rate of at least 3.0 g/10 minutes and a molecular weight distribution of less than 5.0 and from 0.01 to less than 4.0 parts by weight of a crystalline ethylene polymer having a melt flow rate of from 0.5 to 300 g/10 minutes, a density of at least 0.910 g/cm$^3$, and a crystallization temperature of at least 85° C. and which is at least 1° C. higher than the crystallization temperature of the crystalline propylene polymer.

11 Claims, No Drawings

POLYPROPYLENE COMPOSITION AND FILM THEREOF

FIELD OF THE INVENTION

The present invention relates to a polypropylene composition and the film thereof. More specifically the invention relates to a polypropylene composition having an excellent transparency and showing a small film-forming condition dependency of the transparency.

BACKGROUND OF THE INVENTION

Since a polypropylene film has excellent appearance, heat resistance, rigidity, etc., the film is widely used in a packaging field such as food packaging, fiber packaging, etc.

Recently, high-speed film formation by a large-sized film forming machine has been practiced to improve the productivity and also various thicknesses of the films have been employed to widen the purposes of uses. In this case, as a result thereof, a cooling condition at film formation changes, which gives large influences on the transparency of the films formed, and a problem occurs that the transparency of the film, which is good at low-speed film formation or in the thin films having a thickness of from about 20 to 30 μm, is greatly reduced at high-speed film formation or in the films having a thickness of at least 50 μm.

To overcome the problem, an attempt to decrease the surface temperature of a cooling roll by decreasing the temperature of cooling water, an attempt to directly cool a molten resin extruded with water without using a cooling roll, etc., have been made and an effect can be obtained to a certain extent. However, the influences of the temperature of cooling water, the deviation of the flow rate, etc., cannot be avoided and a sufficient effect has not yet been obtained.

Thus, development of a polypropylene composition and a polypropylene film having a good transparency and showing small film-forming condition dependency and also small thickness dependency of the transparency has been desired.

A reforming method of thermally decomposing or peroxide-decomposing a polypropylene resin, a method of compounding a polypropylene resin with a sorbitol nucleating agent, etc., are known as a method of improving the transparency of a polypropylene film.

In the reforming method of decomposing a polypropylene resin, the improvement effect may be obtained at low-speed film formation when the surface temperature of a cooling roll is low, but no effect is obtained at high-speed film formation when the surface temperature of a cooling roll is high. Further, in the case of high-speed film formation of thick films, the transparency is greatly reduced.

Also, in the method of compounding a sorbitol nucleating agent, an effect of improving the transparency may be obtained, but since use of the sorbitol nucleating agent causes an unpleasant odor of the film obtained, there is a restriction on the use thereof.

SUMMARY OF THE INVENTION

Accordingly, an object of the present invention is to provide a polypropylene composition and the film thereof having a good transparency and showing small film-forming condition dependency and also small thickness dependency of the transparency without reducing the preferred characteristics the polypropylene film inherently possesses.

As a result of various investigations to develop a polypropylene composition and the film thereof having a good transparency and showing small film-forming condition dependency and also small thickness dependency of the transparency, it has been found that the problem in the prior art can be overcome by using a polymer having a melt flow rate and a molecular weight distribution in specific ranges as a crystalline propylene polymer and compounding the polymer with a specific amount of a crystalline ethylene polymer having a melt flow rate, a density, and a crystallization temperature under a quenching condition of at least 1° C./second in specific ranges to provide a composition. The present invention has been attained based on this finding.

That is, according to one embodiment of the present invention, there is provided a polypropylene composition comprising 100 parts by weight of a crystalline propylene polymer having a melt flow rate of at least 3.0 g/10 minutes and a molecular weight distribution of less than 5.0 and from 0.01 to less than 4.0 parts by weight of a crystalline ethylene polymer having a melt flow rate of from 0.5 to 300 g/10 minutes, a density of at least 0.910 g/cm$^3$ and a crystallization temperature of at least 85° C. and which is at least 1° C. higher than the crystallization temperature of the crystalline propylene polymer.

According to another embodiment of the present invention, there is provided a polypropylene film formed by melt-extruding the polypropylene composition.

DETAILED DESCRIPTION OF THE INVENTION

The present invention is described in detail below.

The crystalline propylene polymer used in the present invention has a melt flow rate of at least 3.0 g/10 minutes and a molecular weight distribution of less than 5.0.

The crystalline propylene polymer having a melt flow rate of from 3.0 to 50 g/10 minutes is preferred in the points of the transparency and the high-speed workability.

If the molecular weight distribution of the crystalline propylene polymer is over 5.0, the polypropylene composition and the film thereof having excellent transparency and showing small film-forming condition dependency of the transparency, which are the object of the present invention, cannot be obtained.

The crystalline propylene polymer used in the present invention is a crystalline propylene homopolymer or a crystalline propylene-α-olefin copolymer.

Examples of the crystalline-α-olefin copolymer are a propylene-ethylene copolymer, a propylene-butene-1 copolymer, a propylene-ethylene-butene-1 copolymer, etc., which are substantially random copolymers. A mixture of those copolymers may be used if those copolymers have a melt flow rate of at least 3.0 g/10 minutes and a molecular weight distribution of less than 5.0.

Preferred crystalline propylene polymer used in the present invention is a crystalline propylene-α-olefin polymer having an α-olefin content of from 2.0 to 30% by weight and a molecular weight distribution of 4.5 or less, from the points of the improving effects of the low-temperature heat sealing property and the film-forming condition dependency of the transparency.

Also, the crystalline propylene polymer can be preferably produced by polymerization using a Ziegler-Natta catalyst comprising Ti, Mg, and Cl as the essential components.

The crystalline ethylene polymer used in the present invention is an ethylene homopolymer or an ethylene-α-olefin copolymer having a melt flow rate of from 0.5 to 300 g/10 minutes, a density of at least 0 910 g/cm$^3$ and a crystallization temperature of at least 85° C. and which is at least 1° C. higher than the crystallization temperature of the crystalline propylene polymer.

If any one of the melt flow rate, the density, and the crystallization temperature of the crystalline ethylene polymer is outside the above-described range, the polypropylene composition and the film thereof having excellent transparency and showing small film-forming condition dependency of the transparency, which are the object of the present invention, cannot be obtained.

As the crystalline ethylene polymer used in the present invention, it is important to use the crystalline ethylene polymer having a crystallization temperature of at least 1° C. higher than the crystallization temperature of the crystalline propylene polymer used in the present invention. If the crystallization temperature of the crystalline ethylene polymer is lower than the crystallization temperature of the crystalline propylene polymer used in the present invention plus 1° C., the effect of the present invention is not obtained.

As the crystalline ethylene polymer used in the present invention, the crystalline ethylene polymer having a melt flow rate of from 1 to 100 g/10 minutes and a crystallization temperature of at least 85° C. and which is at least 2° C. higher than the crystallization temperature of the crystalline propylene polymer used in the present invention is preferred, and the straight chain crystalline ethylene polymer having a crystallization temperature of at least 90° C. and which is at least 5° C. higher than the crystallization temperature of the crystalline propylene polymer is more preferred.

The amount of the crystalline ethylene polymer compounded is from 0.01 to 4.0 parts by weight per 100 parts by weight of the crystalline propylene poisoner. If the amount of the crystalline ethylene polymer compounded is less than 0.01 part by weight, the improving effects of the transparency and the film-forming condition dependency of the transparency are poor. Also, if the amount is over 4.0 parts by weight, the transparency is reduced and the heat resistance becomes poor, whereby fish eyes occur in the film or holes are formed in the film. Hence the preferred characteristics the polypropylene film inherently possesses are reduced. The extent of the reduction of the transparency when the amount of the crystalline ethylene polymer compounded is over 4.0 parts by weight changes according to the melt flow rate of the crystalline ethylene polymer compounded. In the case of using the crystalline ethylene polymer having a melt flow rate of at least about 5 g/10 minutes, even when the amount of the crystalline ethylene polymer compounded is over the range defined in the present invention, a film having a good transparency may be, as the case may be, obtained. In this case, however, the heat resistance is poor and troubles such as the reduction of the appearance of the film, etc., are liable to occur, whereby the object of the present invention cannot be obtained.

The amount of the crystalline ethylene polymer compounded is in the range of preferably from 0.01 to 2.5 parts by weight, and more preferably from 0.02 to 1.0 part by weight.

The production methods for the polypropylene composition of the present invention which can be employed are a method of previously melt-kneading pellets and/or powders of the crystalline propylene polymer and the crystalline ethylene polymer, a method of compounding a master batch of the crystalline ethylene polymer, etc. However, any method wherein the composition within the range of the present invention is formed at film formation can be employed.

The polypropylene composition of the present invention can be compounded, if necessary, with an antioxidant, a neutralizing agent, a lubricant, an antiblocking agent, an antistatic agent, etc., which are usually used in the field of the art.

The polypropylene composition of the present invention is suitably used for the production of melt-extruded molding having a thickness of from 10 to 1,000 μm, which is produced under quenching at a cooling rate of at least 1° C./second, and is particularly suitably used for the production of an unstretched film having a thickness of from 10 to 100 μm.

Also, since the polypropylene composition of the present invention has the preferred characteristics described above, the composition is suitably used as at least one layer component at the production of multi-layer films by co-extrusion film-forming method.

There is no particular restriction on the production method of the polypropylene film of the present invention if the method can produce the polypropylene film by a melt-extrusion molding method such as a T-die film-forming method, a tubular film-forming method, etc. The T-die film-forming method wherein high-speed film formation is practiced by a large-sized film-forming machine is preferably used.

The present invention is described in greater detail by reference to the following Examples, which should not be construed as limiting the scope of the present invention.

The measurement method of each item in the specification and examples of the present invention was as follows.

(1) Melt Flow Rate (MFR)

The crystalline propylene polymer was measured by the method of Condition-14 according to JIS K7210 and the crystalline ethylene polymer was measured by the method of Condition-4.

(2) Molecular Weight Distribution (Mw/Mn)

By GPC (gel permeation chromatography), the molecular weight distribution was measured under the following conditions.
Machine Type: 150CV Type (manufactured by Millipore Waters Co.)
Column: Shedex M/S 80
Measurement Temperature: 145° C.
Solvent: Orthodichorobenzene
Sample Concentration: 5 mg/8 ml When Standard Reference Material 706 (polystyrene of Mw/Mn=2.1) of NBS (National Bureau of Standards) was measured under the above conditions, the molecular weight distribution (Mw/Mn) of 2.1 was obtained.

(3) Crystallization Temperature (Tc)

After previously melting 5 mg of a test piece at 220° C. for 5 minutes in a nitrogen gas atmosphere, the temperature thereof was decreased to 30° C. at a temperature-lowering rate of 60° C./minute (1° C./second), the maximum peak of the crystallization calorific curve of the sample obtained by using a differential scanning calorimeter (DSC-7 quenching-corresponding type, made by Perkin-Elmer Co.) was defined as the crystallization temperature (Tc).

(4) Ethylene Content and Butene-1 Content

Ethylene content: The ethylene content was determined by the IR spectral method described in *Kohbunshi Bunseki* (*Polymer Analysis*) *Handbook*, page 2 [(i) Random Copolymer], published by Asakura Shoten, 1985.

Butene-1 content: Determined by the following equation by the IR spectral method.

$$\textit{Butene-1 content (weight \%)} = 1.208 K'$$

wherein K' is an absorbance in 767 cm$^{-1}$ (5) Density

Measured according to JIS K6760

(6) Transparency (haze)

Measured according to JIS K7105.

(7) Heat Sealing Temperature

The heat sealing temperature was measured using the film having a thickness of 30 μm. Sealed films of 25 mm in width obtained by press-adhering the superposed films by a heat sealer heated to a definite temperature for 2 seconds by applying a load of 2 kg/cm$^2$ were allowed to stand overnight and the films were peeled off from each other at 23° C., a peeling speed of 200 mm/minute, and a peeling angle of 180°. In this case, the temperature of the heat sealer when the peeling resistance became 300 g/25 mm was defined as the heat sealing temperature.

REFERENCE EXAMPLE (a) Synthesis of Organomagnesium Compound

After replacing the inside atmosphere of a one liter flask equipped with a stirrer, a reflux condenser, a dropping funnel, and a thermometer with argon, 32-0 g of shaved-form magnesium for a Grignard reagent was placed in the flask. Then, 120 g of butyl chloride and 500 ml of dibutyl ether were charged in the dropping funnel and about 30 ml of the mixture was dropped onto magnesium in the flask to initiate the reaction. After the initiation of the reaction, dropping of the mixture was continued at 50° C. for 4 hours and thereafter, the reaction was further conducted at 60° C. for one hour. Thereafter, the reaction mixture was cooled to room temperature and solid components were filtered off.

When butylmagnesium chloride in dibutyl ether was hydrolyzed with 1N sulfuric acid and the concentration was determined by back-titrating with an aqueous solution of 1N sodium hydroxide using phenolphthalein as the indicator, the concentration was 2.1 mol/liter.

b) Synthesis of Solid Product

After replacing the inside atmosphere of a 500 ml flask equipped with a stirrer and a dropping funnel with argon, 240 ml of hexane, 5.4 g (15.8 mmols) of tetrabutoxytitanium, and 61.1 g (295 mmols) of tetraethoxysilane were placed in the flask to form a homogeneous solution. Then, 150 ml of the organomagnesium compound synthesized in the above step (a) was gradually added dropwise to the mixture from the dropping funnel over a period of 4 hours while keeping the temperature of the inside of the flask. Thereafter, the resulting mixture was further stirred at room temperature for one hour and solids formed were separated from liquid at room temperature, repeatedly washed 3 times with 240 ml of hexane and dried at reduced pressure to obtain 45.0 g of a light-brown solid product.

The solid product obtained contained 1.7% by weight of a titanium atom, 33.8% by weight of an ethoxy group, and 2.9% by weight of a butoxy group.

Also, in the wide angle X-ray diffraction diagram of the solid product by the Cu—Ka line, no clear diffraction peaks were observed, which showed that the product had a noncrystalline structure.

(c) Synthesis of Ester-Treated Solid

After replacing the inside atmosphere of 100 ml flask with argon, 6.5 g of the solid product synthesized in the above step (b), 16.2 ml of toluene, and 4.3 ml (16 mmols) of diisobutyl phthalate were placed in the flask and the reaction was conducted at 95° C. for one hour.

After completion of the reaction, solids were separated from liquid and washed 3 times with 33 ml of toluene.

(d) Synthesis of Solid Catalyst (activation treatment)

After finishing washing in the above step (c), 16.2 ml of toluene, 0.36 ml (1.3mmols) of diisobutyl phthalate, 2.2 ml (13 mmols) of dibutyl ether, and 38.0 ml (346 mmols) of titanium tetrachloride were added to the solids in the flask and the reaction was conducted at 95° C. for 3 hours. After completion of the reaction, solids formed were separated from liquid at 95° C. and washed twice with 33 ml of toluene at the same temperature. Then, the above washing treatment with the mixture of diisobutyl phthalate, dibutyl ether, and titanium tetrachloride was repeated once more under the same condition and the solid product was washed 3 times with 33 ml of hexane to obtain 5.0 g of a less-color solid catalyst.

The solid catalyst contained 2.1% by weight of a titanium atom, 19.9% by weight of a magnesium atom, and 12.7% by weight of a phthalic acid ester.

EXAMPLE 1

(a) Catalyst Component

Into a 250 liter reaction vessel equipped with a stirrer was added 150 liter of sufficiently purified hexane and after sufficiently replacing the inside atmosphere of the system with a nitrogen gas, 3.2 mols of triethylaluminum (TEA), 0.32 mol of cyclohexylethyldimethoxysilane (CHEDMS), and the solid catalyst obtained in the above Reference Example in an amount of 51.8 g calculated as Ti atom were added into the reaction vessel. Then, 2.8 kg of propylene was continuously added thereto over a period of 2 hours while keeping the temperature of the system at 25° C.

(b) Polymerization

Using 3 polymerization baths having inside volumes of 20 to 45 m$^3$, the catalyst component prepared in the above step (a) was supplied thereto such that the polymerization temperature became 75° C., the polymerization pressure became 20 kg/cm$^2$ G, and an average residence time became 6 hours and while simultaneously supplying thereto TEA and CHEDMS, a gas-phase polymerization was conducted by continuously supplying propylene and hydrogen such that the H$_2$ concentration in the gas-phase portion became 0.7%.

The polymer obtained had a melt flow rate (230° C.) of 9.3 g/10 minutes, a molecular weight distribution (Mw/Mn) of 3.7, and a crystallization temperature (Tc) of 105° C.

After compounding 100 parts by weight of the crystalline propylene polymer and 0.2 part by weight of a high-density polyethylene (Nissan Polyethylene 1150, made by Nissan Maruzen Polyethylene K.K.) having a melt flow rate (190° C.) of 15g/10minutes, a density of 0.956 g/cm³ and a crystallization temperature (Tc) of 107° C., 0.05 part by weight of calcium stearate, 0.1 part of Sumilizer BHT (trade name, made by Sumitomo Chemical Company, Limited), and 0.05 part by weight of Irganox 1010 (trade name, made by Ciba-Geigy AG) were added to the above mixture followed by mixing with a Henschel mixer, and the resulting mixture was melt-extruded to form pellets. The pellets were melt-extruded by a T-die film-forming machine having a diameter of 50 mm at a die temperature of 250° C. and cooled by a cooling roll to obtain unstretched films each having a thickness of 30 μm or 70 μm.

In this case, the temperature of cooling water supplied to the cooling roll was changed and cooling was practiced at 30° C. and 70° C. The surface temperatures of the cooling roll were 30° C. and 66° C., respectively.

The transparency (haze), the appearance, etc., of each film obtained are shown in Table 2 below.

tion pressure of 6 kg/cm² G, and a gas-phase hydrogen concentration of 2.9%.

The polymer obtained had a melt flow rate of 12 g/10 min., a molecular weight distribution of 6.1, and a crystallization temperature of 102° C. Using the crystalline propylene polymer, the same procedure as in Example 1 and the same procedure as in Comparative Example 1 were practiced, respectively, to form films and the films were evaluated. The evaluation results obtained are shogun in Table 2 below.

The unstretched films obtained using the composition of the present invention have a good transparency in a stable level from a low temperature range to a high temperature range of a cooling roll and from a small thickness to a relatively large thickness range.

In addition, the properties of the crystalline propylene polymers and the crystalline ethylene poisoners used in Example 1 and Comparative Examples 1 to 5 are shown in Table 1 below.

TABLE 1

| | Crystalline Propylene Polymer | | | | | Crystalline Ethylene Polymer | | | |
|---|---|---|---|---|---|---|---|---|---|
| | MFR (230° C.) (g/10 min) | Mw/Mn | α-Olefin content | | Tc (°C.) | MFR (190° C.) (g/10 min) | Density (g/cm³) | Tc (°C.) | Amount (Parts by weight) |
| | | | Ethylene (wt %) | 1-Butene (wt %) | | | | | |
| Example 1 | 9.3 | 3.7 | 0 | 0 | 105 | 15 | 0.956 | 107 | 0.2 |
| Comparative Example 1 | 9.3 | 3.7 | 0 | 0 | 105 | — | — | — | 0 |
| Comparative Example 2 | 2.5 | 4.0 | 0 | 0 | 104 | 15 | 0.956 | 107 | 0.5 |
| Comparative Example 2 | 2.5 | 4.0 | 0 | 0 | 104 | — | — | — | 0 |
| Comparative Example 4 | 12 | 6.1 | 0 | 0 | 102 | 15 | 0.956 | 107 | 0.2 |
| Comparative Example 5 | 12 | 6.1 | 0 | 0 | 102 | — | — | — | 0 |

COMPARATIVE EXAMPLE 1

By following the same procedure as in Example 1 except that the crystalline propylene polymer was used but the high-density polyethylene was not compounded therewith, a film was prepared and evaluated. The evaluation results obtained are shown in Table 2 below.

COMPARATIVE EXAMPLES 2 AND 3

The homopolymerization of propylene as in Example 1 was conducted using the same catalyst system and the same polymerization method as in Example 1 except that the hydrogen concentration was changed to 0.25%.

The polymer obtained had a melt flow rate of 2.5 g/10 minutes, a molecular weight distribution of 4.0, and a crystallization temperature of 104° C. Using the crystalline propylene polymer, the same procedure as in Example 1 and the same procedure as in Comparative Example 1 were followed, respectively, except that the amount of the crystalline ethylene polymer compounded was changed to form films and those films were evaluated. The evaluation results obtained are shown in Table 2 below.

COMPARATIVE EXAMPLES 4 AND 5

Using a polymerization bath having an inside volume of 23 m³ equipped with a stirrer, propylene was continuously polymerized in the co-presence of the solid catalyst described in JP-A-47-34478 (the term "JP-A" as used herein means an "unexamined published Japanese patent application"), diethylaluminum chloride, an electron donor, and hydrogen, using heptane as the solvent at a polymerization temperature of 60° C., a polymeriza-

TABLE 2

| | Transparency (Haze)(%) | | | | Heat Sealing Temperature (°C.) |
|---|---|---|---|---|---|
| | Cooling Roll Water Temp.: 30° C. Film Thickness | | Cooling Roll Water Temp.: 70° C. Film Thickness | | |
| | 30 μm | 70 μm | 30 μm | 70 μm | |
| Example 1 | 2.3 | 4.7 | 6.0 | 11.2 | 150 |
| Comparative Example 1 | 0.7 | 1.9 | 11.1 | 27 | 150 |
| Comparative Example 2 | 6.7 | 14.5 | 7.9 | 11.1 | — |
| Comparative Example 3 | 6.5 | 14.0 | 8.2 | 12.0 | — |
| Comparative Example 4 | 2.5 | 5.1 | 11.3 | 21 | — |
| Comparative Example 5 | 1.8 | 4.0 | 14 | 30 | — |

EXAMPLE 2

By using the same catalyst system and the same polymerization method as in Example 1, a gas-phase continuous polymerization of a mixed system of propylene, ethylene, and butene-1 was conducted at a polymerization temperature of 80° C., a polymerization pressure of from 7 to 15 kg/cm² G, and a H₂ concentration of 0.25% to obtain a propylene-ethylene-butene-1 random copolymer having an ethylene content of 1.2% by weight and butene-1 content of 10.2% by weight as a crystalline propylene polymer.

The polymer obtained had a melt flow rate of 5.7 g/10 min., a molecular weight distribution of 3.0, and a crystallization temperature of 81° C.

After compounding 100 parts by weight of the crystalline propylene polymer with 0.5 part by weight of a straight chain intermediate density polyethylene (Neozex 3510F, trade name, made by Mitsui Petrochemical Industries, Ltd.) having a melt flow rate of 1.6 g/10 minutes, a density of 0.935 g/cm$^3$, and a crystallization temperature of 102° C. as a crystalline ethylene polymer, 0.05 part of calcium stearate, 0.15 part by weight of Irganox 1010, 0.1 part by weight of Sumilizer BHT, 0.1 part by weight of erucic amide, and 0.15 part of a fine silica powder, the resulting mixture was melt-extruded to form a film in the same manner as in Example 1 and the film was evaluated. The evaluation results obtained are shown in Table 4 below.

COMPARATIVE EXAMPLE 6

By following the same procedure as in Example 1 except that the crystalline propylene polymer as in Example 2 was used and the crystalline ethylene polymer was not used, a film was prepared and evaluated. The evaluation results obtained are shown in Table 4 below.

EXAMPLES 3 TO 5 AND COMPARATIVE EXAMPLES 7 TO 11

By following the same procedure as in Example 1 except that the crystalline propylene polymer as used in Example 2 was used and the kind and the amount of a crystalline ethylene polymer compounded were changed as shown below and in Table 3 below, respectively.

The crystalline ethylene polymers used were as follows.

Example 3: Sholex 6080 (trade name, made by Showa Denko K.K.).
Example 4: Sumikathene-L GA701 (trade name, made by Sumitomo Chemical Company, Limited).
Example 5: Sumikathene-L GA804 (trade name, made by Sumitomo Chemical Company, Limited).
Comparative Example 7: Neozex 3510F (trade name, made by Mitui Petrochemical Industries, Ltd.).
Comparative Example 8: Excellen VL VL700 (trade name, made by Sumitomo Chemical Company, Limited).
Comparative Example 9: Sumikathene L705 (trade name, made by Sumitomo Chemical Company, Limited).
Comparative Example 10: Sanwax 131P (trade name, made by Sanyo Chemical Industries, Ltd.).
Comparative Example 11: Hizex 5202B (trade name, made by Mitui Petrochemical Industries, Ltd.).

In addition, the crystalline ethylene polymer used in Comparative Example 9 is a long chain branched structure type low-density polyethylene and other crystalline ethylene polymers are straight-chain type low-density to high-density polyethylenes.

TABLE 3

| | Crystalline Propylene Polymer | | | | | Crystalline Ethylene Polymer | | | |
|---|---|---|---|---|---|---|---|---|---|
| | MFR (230° C.) (g/10 min) | Mw/Mn | α-Olefin content | | Tc (°C.) | MFR (190° C.) (g/10 min) | Density (g/cm$^3$) | Tc (°C.) | Amount (Parts by weight) |
| | | | Ethylene (wt %) | 1-Butene (wt %) | | | | | |
| Example 2 | 5.7 | 3.0 | 1.2 | 10.2 | 81 | 1.6 | 0.935 | 102 | 0.5 |
| Example 3 | 5.7 | 3.0 | 1.2 | 10.2 | 81 | 8 | 0.959 | 107 | 0.02 |
| Example 4 | 5.7 | 3.0 | 1.2 | 10.2 | 81 | 8 | 0.919 | 90 | 0.5 |
| Example 5 | 5.7 | 3.0 | 1.2 | 10.2 | 81 | 55 | 0.930 | 92 | 0.5 |
| Comparative Example 6 | 5.7 | 3.0 | 1.2 | 10.2 | 81 | 13 | — | — | 0 |
| Comparative Example 7 | 5.7 | 3.0 | 1.2 | 10.2 | 81 | 1.6 | 0.935 | 102 | 5.0 |
| Comparative Example 8 | 5.7 | 3.0 | 1.2 | 10.2 | 81 | 10 | 0.905 | 82 | 0.5 |
| Comparative Example 9 | 5.7 | 3.0 | 1.2 | 10.2 | 81 | 7 | 0.919 | 82 | 0.5 |
| Comparative Example 10 | 5.7 | 3.0 | 1.2 | 10.2 | 81 | 320 or more | 0.930 | 84 | 0.5 |
| Comparative Example 11 | 5.7 | 3.0 | 1.2 | 10.2 | 81 | 0.3 | 0.964 | 109 | 0.5 |

TABLE 4

| | Transparency (Haze)(%) | | | | Heat Film Appearance | Sealing Temperature (°C.) |
|---|---|---|---|---|---|---|
| | Cooling Roll Water Temp.: 30° C. Film Thickness | | Cooling Roll Water Temp.: 70° C. Film Thickness | | | |
| | 30 μm | 70 μm | 30 μm | 70 μm | | |
| Example 2 | 1.8 | 2.2 | 2.8 | 3.2 | Good | 119 |
| Example 3 | 1.2 | 1.5 | 4.3 | 4.5 | Good | 118 |
| Example 4 | 1.0 | 1.2 | 1.8 | 2.4 | Good | 119 |
| Example 5 | 0.9 | 1.2 | 1.5 | 1.9 | Good | 119 |
| Comparative Example 6 | 1.0 | 1.3 | 6.8 | 9.0 | Good | 118 |
| Comparative Example 7 | 11.8 | 14 | 10.7 | 12.2 | Good | 122 |
| Comparative Example 8 | 1.0 | 1.1 | 6.4 | 7.7 | Good | 118 |
| Comparative Example 9 | — | — | 6.8 | 7.6 | Good | |
| Comparative Example 10 | — | — | 7.8 | 9.6 | Good | 124 |
| Comparative | — | — | 6.8 | 7.4 | Poor | 125 |

TABLE 4-continued

|  | Transparency (Haze)(%) | | | | Heat Film Appearance | Sealing Temperature (°C.) |
|---|---|---|---|---|---|---|
|  | Cooling Roll Water Temp.: 30° C. Film Thickness | | Cooling Roll Water Temp.: 70° C. Film Thickness | | | |
|  | 30 μm | 70 μm | 30 μm | 70 μm | | |
| Example 11 |  |  |  |  | Many fish eyes occurred |  |

EXAMPLES 6 AND 7

By polymerizing a mixed system of propylene and ethylene and a mixed system of propylene and butene-1 using the same catalyst system and the same polymerization method as in Example 1, and propylene-ethylene random copolymer and a propylene-butene-1 copolymer shown in Table 5 below were obtained, respectively.

By following the same procedure as in Example 1 except that each of those copolymers was used and the amount of the crystalline ethylene polymer compounded was changed, each film was obtained and the films were evaluated. The evaluation results obtained are shown in Table 6 below.

COMPARATIVE EXAMPLES 12 AND 13

A mixed system of propylene, ethylene, and butene-1 was continuously polymerized by the same polymerization method as in Example 1 at a polymerization temperature of 50° C., at a polymerization pressure of 5 kg/cm²G, and a gas phase hydrogen concentration of 4.5% to obtain a propylene-ethylene-butene-1 random copolymer having an ethylene content of 2.1% by weight, a butene-1 content of 4.2% by weight, a melt flow rate of 3.9 g/10 minutes, and a molecular weight distribution of 5.2.

After compounding 100 parts by weight of the copolymer obtained with 0.05 part by weight of calcium stearate, 0.15 part by weight of Irganox, 0.1 part by weight of Sandostab P-ERQ (trade name, made by Sandoz), 0.1 part by weight of erucic amide, and 0.15 part of a fine silica powder, the resulting mixture was melt-extruded in the same manner as in Example 1 to form a film and the film was evaluated. (Comparative Example 12).

By following the same procedure as in the above Comparative Example 12 except that a crystalline ethylene polymer was added to the random copolymer obtained in Comparative Example 12, the film obtained was evaluated. (Comparative Example 13).

The evaluation results obtained are shown in Table 6 below.

EXAMPLE 8

After compounding 100 parts by weight of the random copolymer obtained in Comparative Example 12 with 0.05 part by weight of calcium stearate, 0.15 part of Irganox 1010, 0.1 part by weight of Sandostab P-EPQ, 0.1 part by weight of erucic amide, 0.15 part by weight of a fine silica powder, and 0.002 part by weight of 2,5-dimethyl-2,5-di(tert-butyl peroxide), the resulting mixture was melt-extruded to obtain pellets. The pellets had a melt flow rate of 5.2 g/10 minutes, a molecular weight distribution of 4.5, and a crystallization temperature of 82° C.

Then, 100 parts by weight of the propylene-ethylene-butene-1 random copolymer pellets were mixed with 0.2 part by weight of the high-density polyethylene as used in Example 1 at room temperature. An unstretched film was formed using the mixture by the same manner as in Example 1 and evaluated. The evaluation results obtained are shown in Table 6 below.

COMPARATIVE EXAMPLE 14

By polymerizing a mixed system of propylene and ethylene by the same polymerization method as in Comparative Example 4 at a polymerization temperature of 50° C., a polymerization pressure of 5 kg/cm² G, and a gas phase hydrogen concentration of 2.3%, a propylene-ethylene random copolymer having an ethylene content of 3.7% by weight was obtained.

To 100 parts by weight of the copolymer obtained were added 0.05 part by weight of calcium stearate, 0.1 part by weight of Sumilizer BHT and 0.05 part by weight of Irganox 1010 and after mixing the mixture by a Henschel mixer, the mixture was melt-extruded to form pellets. The pellets had a melt flow rate of 2.8 g/10 minutes and a molecular weight distribution of 5.0.

Then, 100 parts by weight of the propylene-ethylene random copolymer pellets were mixed with 0.2 part by weight of the high-density polyethylene as used in Example 1 at room temperature. An unstretched film was prepared using the mixture in the same manner as in Example 1 and evaluated. The evaluation results obtained are shogun in Table 6 below.

EXAMPLE 9

By following the same procedure as in Comparative Example 14 except that 0.02 part by weight of 2,5-dimethyl-2,5-di(tert-butyl peroxide) was added to the propylene-ethylene random copolymer of Comparative Example 14 in mixing the copolymer by a Henschel mixer, pellets were formed. The pellets had a melt flow rate of 11 g/10 minutes, a molecular weight distribution of 3.2, and a crystallization temperature of 82° C. The pellets obtained were mixed with the high-density polyethylene in the same manner as in Comparative Example 14 and a film was prepared in the same manner as in Comparative Example 14 and evaluated. The evaluation results obtained are shown in Table 6 below.

TABLE 5

| | Crystalline Propylene Polymer | | | | | Crystalline Ethylene Polymer | | | |
|---|---|---|---|---|---|---|---|---|---|
| | MFR (230° C.) (g/10 min) | Mw/Mn | α-Olefin content Ethylene (wt %) | α-Olefin content 1-Butene (wt %) | Tc (°C.) | MFR (190° C.) (g/10 min) | Density (g/cm³) | Tc (°C.) | Amount (Parts by weight) |
| Example 6 | 4.3 | 2.3 | 3.9 | 0 | 83 | 15 | 0.956 | 107 | 0.05 |
| Example 7 | 5.4 | 3.1 | 0 | 21 | 76 | 15 | 0.956 | 107 | 0.5 |
| Example 8 | 5.2 | 4.5 | 2.1 | 4.2 | 82 | 15 | 0.956 | 107 | 0.2 |
| Example 9 | 11 | 3.2 | 3.7 | 0 | 84 | 15 | 0.956 | 107 | 0.2 |
| Comparative Example 12 | 3.9 | 5.2 | 2.1 | 4.2 | 82 | — | — | — | 0 |
| Comparative Example 13 | 3.9 | 5.2 | 2.1 | 4.2 | 82 | 15 | 0.956 | 107 | 0.2 |
| Comparative Example 14 | 2.8 | 5.0 | 3.7 | 0 | 84 | 15 | 0.956 | 107 | 0.2 |

TABLE 6

| | Cooling Roll Water Temp.: 30° C. Film Thickness | | Cooling Roll Water Temp.: 70° C. Film Thickness | | Heat Sealing Temperature (°C.) |
|---|---|---|---|---|---|
| | 30 μm | 70 μm | 30 μm | 70 μm | |
| Example 6 | 1.0 | 1.1 | 2.2 | 3.7 | 128 |
| Example 7 | 1.5 | 2.0 | 2.3 | 2.5 | 109 |
| Example 8 | 3.9 | 4.8 | | | 126 |
| Example 9 | 1.1 | 1.3 | 2.5 | 3.5 | 128 |
| Comparative Example 12 | 6.3 | 7.7 | 9.2 | 17 | — |
| Comparative Example 13 | 6.7 | 8.8 | 8.2 | 9.2 | — |
| Comparative Example 14 | — | — | 7.4 | 9.3 | 128 |

As described above, by using the polypropylene composition of the present invention, a film having a good transparency and showing very small film-forming condition dependency and thickness dependency of the transparency can be obtained without deterioration of the preferred characteristics the film of polypropylene inherently possesses, and the polypropylene composition can be suitably used for high-speed film-formation by a melt-extrusion.

While the invention has been described in detail and with reference to specific embodiments thereof, it will be apparent to one skilled in the art that various changes and modifications can be made therein without departing from the spirits and scope thereof.

What is claimed is:

1. A polypropylene composition comprising 100 parts by weight of a crystalline propylene polymer containing at least 70% by weight propylene having a melt flow rate of at least 3.0 g/10 minutes and a molecular weight distribution of less than 5.0 and from 0.01 to less than 4.0 parts by weight of a crystalline ethylene polymer having a melt flow rate of from 0.5 to 300 g/10 minutes, a density of at least 0.910 g/cm³, and a crystallization temperature of at least 85° C. and which is at least 1° C. higher than the crystallization temperature of the crystalline propylene polymer.

2. A polypropylene composition as claimed in claim 1, wherein the crystalline propylene polymer has the melt flow rate of from 3.0 to 50 g/10 minutes.

3. A polypropylene composition as claimed in claim 1, wherein the crystalline propylene polymer is a crystalline propylene homopolymer or a crystalline propylene-α-olefin copolymer.

4. A polypropylene composition as claimed in claim 3, wherein the crystalline propylene-α-olefin copolymer is a propylene-ethylene copolymer, a propylene-butene-1 copolymer or a propylene-ethylene-butene-1 copolymer.

5. A polypropylene composition as claimed in claim 3, wherein the crystalline propylene-α-olefin copolymer has an α-olefin content of from 2.0 to 30% by weight and the molecular weight distribution of 4.5 or less.

6. A polypropylene composition as claimed in claim 1, wherein the crystalline ethylene polymer has the melt flow rate of from 1 to 100 g/10 minutes and the crystallization temperature of at least 85° C. and which is at least 2° C. higher than the crystallization temperature of the crystalline propylene poisoner.

7. A polypropylene composition as claimed in claim 1, wherein the crystalline ethylene polymer is a straight-chain crystalline ethylene polymer having a crystallization temperature of at least 90° C. and which is at least 5° C. higher than the crystallization temperature of the crystalline propylene polymer.

8. A polypropylene composition as claimed in claim 1, wherein the crystalline ethylene polymer is used in an amount of from 0.01 to 2.5 parts by weight.

9. A polypropylene composition as claimed in claim 1, wherein the crystalline ethylene polymer is used in an amount of from 0.02 to 1.0 parts by weight.

10. A polypropylene film obtained by melt-extruding the polypropylene composition as claimed in claim 1.

11. A polypropylene polymer composition comprising crystalline polypropylene polymer containing at least 70% by weight propylene and crystalline polyethylene polymer having a melt flow rate of 0.5 to 300 g/10 min and a density of at least 0.910 g/cm³, wherein the crystalline polypropylene polymer has a melt flow rate of at least 3.0 g/10 min and a molecular weight distribution (Mw/Mn) of less than 5.0 and is blended with the crystalline polyethylene polymer having a crystalline temperature higher than the crystalline temperature of the crystalline polypropylene polymer by at least 1° C., the crystalline temperature of the crystalline polyethylene polymer being 85° C. or higher, the crystalline polyethylene polymer being present in an amount of from 0.01 to 4 parts by weight per 100 parts by weight of the crystalline polypropylene polymer.

* * * * *